United States Patent
Ito et al.

(10) Patent No.: US 7,160,968 B2
(45) Date of Patent: Jan. 9, 2007

(54) PHOSPHORIC ACID GROUP-CONTAINING POLYMER ELECTROLYTE (COMPOSITE) MEMBRANE AND ITS PRODUCTION METHOD

(75) Inventors: Iko Ito, Osaka (JP); Masahiro Rikukawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/399,628

(22) PCT Filed: Oct. 19, 2001

(86) PCT No.: PCT/JP01/09209

§ 371 (c)(1),
(2), (4) Date: Apr. 18, 2003

(87) PCT Pub. No.: WO02/33709

PCT Pub. Date: Apr. 25, 2002

(65) Prior Publication Data

US 2004/0044160 A1    Mar. 4, 2004

(30) Foreign Application Priority Data

Oct. 19, 2000  (JP) ............................. 2000-319390
Jul. 4, 2001   (JP) ............................. 2001-204097

(51) Int. Cl.
*C08F 130/02* (2006.01)

(52) U.S. Cl. .................. 526/277; 526/274; 526/286; 526/287; 526/317.1; 526/318.2; 526/304; 526/320; 526/323.1; 526/328.5; 428/311.11; 442/110; 429/30; 429/33; 429/249; 429/254

(58) Field of Classification Search .......... 526/274, 526/277, 286, 287, 304, 317.1, 318.2, 320, 526/323.1, 328.5; 428/311.11; 442/110; 429/30, 33, 249, 254

See application file for complete search history.

(56) References Cited

FOREIGN PATENT DOCUMENTS

JP        48-4547        1/1973

(Continued)

OTHER PUBLICATIONS

Daisuke Inagaki et al., "Phosphonic-Sanki wo yuusuru Shinki Proton Dendou-sei Koubunshi no Gousei to Tokusei Hyouka (I)", Koubunshi Gakkai Yokoushuu (1999), vol. 48, No. 3, 414.

(Continued)

*Primary Examiner*—Helen L. Pezzuto
(74) *Attorney, Agent, or Firm*—Fitzpatrick, Cella, Harper & Scinto

(57) ABSTRACT

The invention relates to solid polyelectrolyte membranes and processes for their production. As solid polyelectrolyte materials, there have been known fluoropolymers which have perfluoroskeletons and side chains bearing sulfonic acid groups and heat-resistant resins which have hydrocarbon skeletons and contain alkylsulfonic acid or alkylphosphoric acid groups introduced thereto. The fluoropolymers are excellent in heat resistance and chemical resistance but have the problem of being expensive, while the heat-resistant resins have the problem of being poor in chemical resistance. Further, solid polyelectrolyte materials having higher electric conductivities have been desired. With the purpose of providing solid polyelectrolyte membranes having satisfactorily high electric conductivities and being excellent in heat resistance and chemical resistance and processes for producing the membranes, solid polyelectrolyte membranes are made from resins bearing both phosphoric acid groups and sulfonic acid groups which resins are obtained by copolymerizing a monomer bearing in the molecule a phosphoric acid group and an ethylenically unsaturated bond with a monomer bearing in the molecule a sulfonic acid group and an ethylenically unsaturated bond.

19 Claims, 4 Drawing Sheets

FOREIGN PATENT DOCUMENTS

| JP | 57-115426 | | 7/1982 |
|---|---|---|---|
| JP | 64-22932 | | 1/1989 |
| JP | 7-50170 | | 2/1995 |
| JP | 7-296634 | | 11/1995 |
| JP | 9-87570 | | 3/1997 |
| JP | 9-110982 | | 4/1997 |
| JP | 10-36657 | | 2/1998 |
| JP | 11-354140 | | 12/1999 |
| JP | 2000-11755 | | 1/2000 |
| JP | 2001-181352 | * | 3/2001 |
| JP | 2001-114834 | | 4/2001 |
| JP | 2003-138088 | * | 5/2003 |

OTHER PUBLICATIONS

Full English translation of Daisuke Inagaki et al., "Synthesis And Evaluation of Novel Proton-Conducting Polymers Containing Phosphoric Ester (I)," Polymer Preprints, Japan vol. 48, No. 3 p. 414 (1999).

Daisuke Inagaki et al., "Synthesis And Evaluation of Novel Proton-Conducting Polymers Containing Phosphoric Ester (III)," Polymer Preprints, Japan vol. 49, No. 4, p. 751 (2000) w/English translation.

Takeshi Kobayashi, et al., "Preparation of Thermally Stable Proton Conducting Polymer II," Polymer Preprints, Japan vol. 42, No. 7, pp. 2490-2492 (1993) w/English translation.

Hisashi Ishikawa, et al., "Preparation and Electrical Properties of Proton Conducting Polymers," Polymer Preprints, Japan vol. 43, No. 3, pp. 735-736 (1994) w/English translation.

Takeshi Kobayashi, et al., "Preparation of Thermally Stable Proton Conductive Polymer," Polymer Preprints, Japan vol. 42, No. 3, p. 730 (1993) w/English translation.

Full English translation of JP 48-4547 A.

Full English translation of JP 7-50170.

Full English translation of JP 64-22932 A.

Full English translation of JP 2000-11755 A.

* cited by examiner

PHOSPHORIC ACID GROUP-CONTAINING POLYMER ELECTROLYTE (COMPOSITE) MEMBRANE AND ITS PRODUCTION METHOD

This application is a National Stage Filing Under 35 U.S.C. §371 of International Application No. PCT/JP01/09209, filed Oct. 19, 2001, which in turn claims priority of Japanese Patent Application No. 2000-319390, filed Oct. 19, 2000, and Japanese Patent Application No. 2001-204097, filed Jul. 4, 2001, the priorities of which are hereby claimed, said International Application having been published in Japanese, but not in English, as WO 02/337709 A1 on Apr. 25, 2002.

FIELD OF THE INVENTION

The present invention relates to a polymer electrolyte (composite) membrane suitable for the electrolyte membranes of primary cells, second cells, fuel cells, etc., display devices, various sensors, signal-transmitting media, solid capacitors, ion-exchange membranes, etc., and its production method, particularly to a polymer electrolyte (composite) membrane having excellent heat resistance, chemical resistance and dimensional stability and showing high proton conductivity in wide temperature and humidity ranges without using an organic solvent, and its production method.

BACKGROUND OF THE INVENTION

Reported as polymer electrolyte materials are polymers categorized in so-called anion-exchange resins, for instance, polystyrene sulfonic acid, polyvinyl sulfonic acid, perfluorosulfonic acid polymers, perfluorocarboxylic acid polymers [Polymer Preprints, Japan Vol. 42, No. 7, pp. 2490–2492 (1993), Polymer Preprints, Japan Vol. 43, No. 3, pp. 735–736 (1994), Polymer Preprints, Japan Vol. 42, No. 3, pp. 730 (1993)], etc.

Particularly because polymer materials having sulfonic acid groups in side chains tend to be strongly bonded to particular ions and selectively permit cations or anions to permeate therethrough, they are formed into particles, fibers or membranes for use in various applications such as electrodialysis membranes, diffusion dialysis membranes, battery separator membranes, etc. Among others, electrolyte membranes of fluorine-containing polymers having perfluoro-skeletons with sulfonic acid groups bonded to side chains, which are available from DuPont under the trademark of Nafion, are excellent in heat resistance and chemical resistance, so that they are put into practical use as electrolyte membranes capable of withstanding use under severe conditions. However, the above fluorine-containing electrolyte membranes are disadvantageous in difficulty in production and thus extremely expensive.

Also reported is a polymer electrolyte made of a heat-resistant resin having a hydrocarbon skeleton such as polybenzimidazole, etc., into which an alkyl sulfonic acid group or an alkyl phosphoric acid group is introduced (JP 9-87570 A, JP 9-110982 A). This polymer electrolyte exhibits high electric conductivity ($10^{-4}$–$10^{-2}$ $Scm^{-1}$) and excellent heat resistance (weight decrease initiation temperature: 250° C. or higher) at a high temperature of 100° C. in a moist state. However, it does not exhibit any electric conductivity in a dry state, and requires the use of a toxic solvent such as dimethylacetamide, etc. in the production of a cast film. Also, because the heat-resistant resin such as polybenzimidazole, etc. is extremely expensive, it is disadvantageous as common materials for automobile fuel cells, etc. from the aspect of cost performance. There is also a report that because resins having polybenzimidazole skeletons and those having hydrocarbon skeletons are generally poor in acid deterioration resistance, they are disadvantageous in durability (JP 2000-11755 A). It is thus desired to provide polymer electrolytes having higher electric conductivity.

OBJECTS OF THE INVENTION

Accordingly, an object of the present invention is to provide a polymer electrolyte membrane having sufficiently high electric conductivity to be used for fuel cells, etc. as well as excellent heat resistance and chemical resistance, and its production method.

Another object of the present invention is to provide a polymer electrolyte composite membrane having sufficiently high electric conductivity to be used for fuel cells, as well as excellent mechanical strength, heat resistance, and durability such as chemical resistance, dimensional stability, etc., and its production method.

DISCLOSURE OF THE INVENTION

As a result of intensive research in view of the above objects, the inventors have found that a polymer electrolyte membrane made of a copolymer of a phosphoric acid group-containing, unsaturated monomer having at least one phosphoric acid group and at least one ethylenic unsaturated bond in a molecule, and a sulfonic acid group-containing, unsaturated monomer having at least one sulfonic acid group and at least one ethylenic unsaturated bond in a molecule has extremely high electric conductivity and low temperature dependency of electric conductivity, as well as excellent heat resistance and chemical resistance. The inventors have also found that by polymerizing a phosphoric acid group-containing, unsaturated monomer (or a phosphoric acid group-containing, unsaturated monomer and a sulfonic acid group-containing, unsaturated monomer), after impregnating or coating the reinforcing sheet with a composition comprising the above monomer together with a polymerization initiator, it is possible to obtain a polymer electrolyte composite membrane exhibiting high proton conductivity in wide temperature and humidity ranges and having excellent mechanical strength and durability without using an organic solvent. The present invention has been completed based on these discoveries.

Thus, the polymer electrolyte membrane of the present invention is made of a phosphoric acid group/sulfonic acid group-containing resin obtained by copolymerizing a phosphoric acid group-containing, unsaturated monomer having at least one phosphoric acid group and at least one ethylenic unsaturated bond in a molecule, and a sulfonic acid group-containing, unsaturated monomer having at least one sulfonic acid group and at least one ethylenic unsaturated bond in a molecule.

The phosphoric acid group-containing, unsaturated monomer is preferably represented by the following general formula (A):

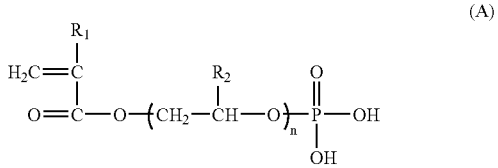

(A)

wherein $R_1$ represents hydrogen or an alkyl group, $R_2$ represents hydrogen or a substituted or unsubstituted alkyl group, and n represents an integer of 1–6. It is preferable that $R_1$ represents H or $CH_3$, and that $R_2$ represents H, $CH_3$ or $CH_2Cl$.

The sulfonic acid group-containing, unsaturated monomer is preferably p-styrene sulfonic acid.

The method for producing a proton-conductive polymer electrolyte membrane made of a phosphoric acid group/sulfonic acid group-containing resin comprises the steps of casting a mixture of a phosphoric acid group-containing, unsaturated monomer having at least one phosphoric acid group and at least one ethylenic unsaturated bond in a molecule, and a sulfonic acid group-containing, unsaturated monomer having at least one sulfonic acid group and at least one ethylenic unsaturated bond in a molecule, and then copolymerizing the cast mixture.

It is preferable to add a photopolymerization initiator to a mixture of the phosphoric acid group-containing, unsaturated monomer and the sulfonic acid group-containing, unsaturated monomer; cast the resultant composition on a molding die; cover at least one surface of the cast composition by an ultraviolet-transmitting plate; and irradiate the cast composition with ultraviolet rays to copolymerize the phosphoric acid group-containing, unsaturated monomer and the sulfonic acid group-containing, unsaturated monomer.

The first proton-conductive polymer electrolyte composite membrane of the present invention comprises a phosphoric acid group-containing resin and a reinforcing sheet. The phosphoric acid group-containing resin is preferably a proton-conductive polymer obtained by polymerizing a phosphoric acid group-containing, unsaturated monomer having at least one phosphoric acid group and at least one ethylenic unsaturated bond in a molecule. The reinforcing sheet is preferably a sheet constituted by inorganic or organic fibers. Also, the reinforcing sheet is preferably a woven fabric, a non-woven fabric, a paper or a resin film. The resin film is preferably microporous.

The method for producing a first proton-conductive polymer electrolyte composite membrane comprising a phosphoric acid group-containing resin and a reinforcing sheet according to the present invention comprises the steps of impregnating or coating the reinforcing sheet with a phosphoric acid group-containing, unsaturated monomer having at least one phosphoric acid group and at least one ethylenic unsaturated bond in a molecule, and polymerizing the phosphoric acid group-containing, unsaturated monomer.

In the above method, it is possible to impregnate or coat the reinforcing sheet with a composition comprising the phosphoric acid group-containing, unsaturated monomer and a photopolymerization initiator, sandwich the reinforcing sheet by ultraviolet-transmitting support substrates, and irradiate it with ultraviolet rays to polymerize the phosphoric acid group-containing, unsaturated monomer.

The second proton-conductive polymer electrolyte composite membrane of the present invention comprises a phosphoric acid group/sulfonic acid group-containing resin and a reinforcing sheet. The phosphoric acid group/sulfonic acid group-containing resin is preferably a copolymer of a phosphoric acid group-containing, unsaturated monomer having at least one phosphoric acid group and at least one ethylenic unsaturated bond in a molecule, and a sulfonic acid group-containing, unsaturated monomer having at least one sulfonic acid group and at least one ethylenic unsaturated bond in a molecule.

The method for producing a second proton-conductive polymer electrolyte composite membrane comprising a phosphoric acid group/sulfonic acid group-containing resin and a reinforcing sheet according to the present invention comprises the steps of impregnating or coating the reinforcing sheet with a composition comprising a phosphoric acid group-containing, unsaturated monomer having at least one phosphoric acid group and at least one ethylenic unsaturated bond in a molecule, and a sulfonic acid group-containing, unsaturated monomer having at least one sulfonic acid group and at least one ethylenic unsaturated bond in a molecule, and then copolymerizing the phosphoric acid group-containing, unsaturated monomer and the sulfonic acid group-containing, unsaturated monomer.

It is preferable in the above method that after impregnated or coated with a composition comprising the phosphoric acid group-containing, unsaturated monomer, the sulfonic acid group-containing, unsaturated monomer and a photopolymerization initiator, the reinforcing sheet is sandwiched by ultraviolet-transmitting support substrates and subjected to ultraviolet irradiation, so that the phosphoric acid group-containing, unsaturated monomer and the sulfonic acid group-containing, unsaturated monomer are copolymerized.

Both of the first and second polymer electrolyte composite membranes of the present invention exhibit as high electric conductivity as $10^{-5}$–$10^{-2}$ $Scm^{-1}$ in a temperature range of 30–80° C. in a moist state, with such excellent heat resistance that their weight decrease initiation temperature is 200° C. or higher, and do not suffer from deformations and defects such as extension and shrinkage, warp, interlayer peeling, etc. in a range of 30–100° C., exhibiting excellent dimensional stability. Particularly the polymer electrolyte composite membrane containing a phosphoric acid group/sulfonic acid group-containing resin has such high electric conductivity as $10^{-3}$–$10^{-2}$ $Scm^{-1}$ in a temperature range of 30–80° C., with an extremely low temperature dependency of electric conductivity.

Though a polymer electrolyte prepared in advance is dissolved in an organic solvent and formed into a cast membrane in the production of a proton-conductive polymer electrolyte membrane by a usual method, a monomer composition is polymerized or copolymerized by ultraviolet irradiation in the production method of the present invention. Accordingly, the method of the present invention is free from troublesome handling of an organic solvent.

THE BEST MODE FOR CARRYING OUT THE INVENTION

Figure 1:
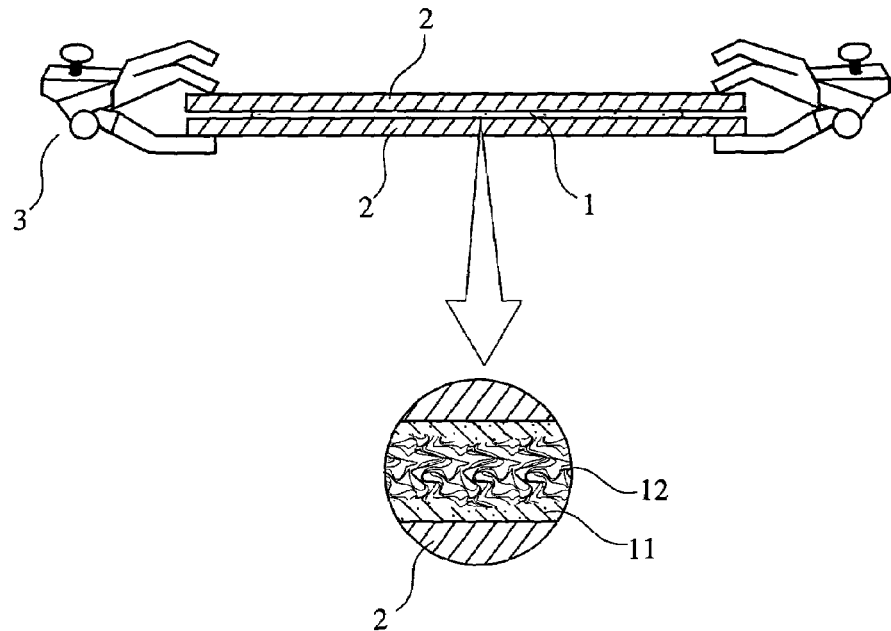
FIG. 1 is a partially cross-sectional side view showing a polymer electrolyte composite membrane sandwiched between two flat glass plates.

Detailed explanation will be given below with respect to the proton-conductive polymer electrolyte (composite) membrane comprising a phosphoric acid group-containing resin or a phosphoric acid group/sulfonic acid group-containing resin and its production method according to the present invention.

[I] Phosphoric Acid Group-Containing Resin and Phosphoric Acid Group/Sulfonic Acid Group-Containing Resin The phosphoric acid group-containing resin and the phosphoric acid group/sulfonic acid group-containing resin used in the present invention are obtained by polymerizing or copolymerizing, as an indispensable component, a phosphoric acid group-containing, unsaturated monomer represented by the following general formula (A):

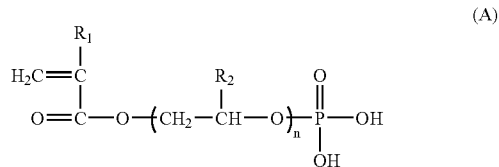

wherein $R_1$ represents hydrogen or an alkyl group, $R_2$ represents hydrogen or a substituted or unsubstituted alkyl group, and n represents an integer of 1–6. $R_1$ is preferably H or $CH_3$, and $R_2$ is preferably H, $CH_3$ or $CH_2Cl$. The above phosphoric acid group-containing, unsaturated monomer may be copolymerized with other unsaturated monomers copolymerizable therewith.

(1) Phosphoric Acid Group-Containing, Unsaturated Monomer

Among the phosphoric acid group-containing, unsaturated monomers represented by the general formula (A), the structural formulae of monomers suitably usable for the present invention are shown in Table 1, and the properties of these monomers are shown in Table 2. These monomers are commercially available from UNI-CHEMICAL CO. LTD. under the tradename of Phosmer™. However, the phosphoric acid group-containing, unsaturated monomers usable in the present invention are not limited thereto.

TABLE 1

| Name | Structure Formula | Grade Name |
| --- | --- | --- |
| Acid Phosphoxy Ethyl Methacrylate | $H_2C=C(CH_3)-C(=O)-O-CH_2-CH_2-O-P(=O)(OH)-OH$ | Phosmer™ M |
| Salt of Mehtacroyl Oxyethyl Acid Phosphate and Monoethanolamine | $H_2C=C(CH_3)-C(=O)-O-CH_2-CH_2-O-P(=O)(OH)-O^- \ ^+NH_2-CH_2-CH_2-OH$ | Phosmer™ MH |
| 3-Chloro-2-Acid Phosphoxy Propyl Methacrylate | $H_2C=C(CH_3)-C(=O)-O-CH_2-CH(CH_2Cl)-O-P(=O)(OH)-OH$ | Phosmer™ CL |

TABLE 1-continued

| Name | Structure Formula | Grade Name |
|---|---|---|
| Acid Phosphoxy Ethyl Acrylate | $H_2C=CH-C(=O)-O-CH_2-CH_2-O-P(=O)(OH)OH$ | Phosmer™ A |
| Acid Phosphoxy Polyoxyethylene Glycol Monomethacrylate | $H_2C=C(CH_3)-C(=O)-O-(CH_2-CH_2-O)_n-P(=O)(OH)OH$, n = 4 to 5 | Phosmer™ PE |
| Acid Phosphoxy Polyoxypropylene Glycol Methacrylate | $H_2C=C(CH_3)-C(=O)-O-(CH_2-CH(CH_3)-O)_n-P(=O)(OH)OH$, n = 5 to 6 | Phosmer™ PP |

TABLE 2

| Grade (Phosmer™) | M | MH | CL |
|---|---|---|---|
| Molecular Weight (g)/Phosphoric Acid Equivalent (g) | 210 | 271 | 258.5 |
| Specific Gravity (at 20° C.) | 1.392 | 1.302 | 1.453 |
| Refractive Index ($n_d$ at 20° C.) | 1.4562 | 1.4815 | 1.4785 |
| Viscosity (poise at 20° C.) Measured by Brookfield Viscometer (Rotor No.) | 80 (No. 1) | 800 (No. 2) | 700 (No. 2) |
| Oxidation Theoretical Value | 533.3 | 206.6 | 433.3 |
| Measured Value | 500 | 196 | 410 |
| pH of Product Water at 20° C. | — | 9.4 | — |
| Solubility at 25° C. (wt %) | 4.1 | 4.3 | 1.3 |
| Monomer-Soluble Solvent | Organic Acids, Ketones, Alcohols | 2-Hydroxyethyl Methacrylate, Methanol, Ethanol, Isopropyl Alcohol, Acrylic Acid, Acetic Acid | Organic Acids, Ketones, Alcohols |

| Grade (Phosmer™) | A | PE | PP |
|---|---|---|---|
| Molecular Weight (g)/Phosphoric Acid Equivalent (g) | 196 | 333 | 440 |
| Specific Gravity (at 20° C.) | 1.468 | 1.248 | 1.157 |
| Refractive Index ($n_d$ at 20° C.) | 1.4664 | 1.4696 | 1.4577 |
| Viscosity (poise at 20° C.) Measured by Brookfield Viscometer (Rotor No.) | 320 (No. 2) | 25 (No. 1) | 55 (No. 2) |
| Oxidation Theoretical Value | 571.4 | — | — |
| Measured Value | — | 320 | 255 |
| pH of Product Water at 20° C. | 9.4 | — | — |
| Solubility at 25° C. (wt %) | — | 4.0 | 3.2 |
| Monomer-Soluble Solvent | Organic Acids, Ketones, Alcohols | Organic Acids, Ketones, Alcohols | Benzene, Toluene, Xylene |

The phosphoric acid group-containing, unsaturated monomers represented by the general formula (A) may be used alone or in combination.

(2) Other Copolymerizable Unsaturated Monomers

Unsaturated monomers copolymerizable with the above phosphoric acid group-containing, unsaturated monomers (1) are classified into the following two groups (2-1), (2-2).

(2-1) Acid Group-Containing, Unsaturated Monomer

The acid group-containing, unsaturated monomer (2-1) is a compound having at least one acid group and at least one ethylenic unsaturated bond in a molecule. The acid groups include a sulfonic acid group, a carboxylic acid group, etc. Among them, the sulfonic acid group-containing, unsaturated monomer (2-1-1) is preferably, providing a phosphoric acid group/sulfonic acid group-containing resin by the copolymerization of the phosphoric acid group-containing, unsaturated monomer and the sulfonic acid group-containing, unsaturated monomer. The polymer electrolyte (composite) membrane comprising the phosphoric acid group/sulfonic acid group-containing resin have better electric conductivity with an extremely low temperature dependency of electric conductivity.

Examples of the sulfonic acid group-containing, unsaturated monomers include ally sulfonic acid, methally sulfonic acid, vinyl sulfonic acid, p-styrene sulfonic acid, butyl (meth)acrylate-4-sulfonic acid, (meth)acryloxy benzene sulfonic acid, t-butyl acrylamide sulfonic acid, 2-acrylic-2-acrylamide-2-methyl propane sulfonic acid, etc. Among them, p-styrene sulfonic acid is preferable. Because degradative chain transfer occurs in allyl sulfonic acid and methallyl sulfonic acid because of their allyl group, their amount is preferably less than 65% by weight. These sulfonic acid group-containing, unsaturated monomers may be used alone or in combination.

Examples of the carboxylic acid group-containing, unsaturated monomers include (meth)acrylic acid, crotonic acid, maleic acid, fumaric acid, itaconic acid, maleic anhydride, etc. These carboxylic acid group-containing, unsaturated monomers may be used alone or in combination.

(2-2) Unsaturated Monomers having No Acid Group

All unsaturated monomers that are not gaseous at room temperature and have at least one ethylenic unsaturated bond in a molecule, except for those described in (2-1), are included in this unsaturated monomer. Among others, (meth)acrylonitrile, (meth)acrylate, and substituted or unsubstituted styrenes are preferable. It is also preferable to use ethylene glycol di(meth)acrylate, trimethylol propane tri(meth)acrylate, hexamethylenediol di(meth)acrylate, divinyl benzene, etc., which have a plurality of ethylenic unsaturated bonds in a molecule, to improve the chemical resistance of the polymer electrolyte (composite) membrane.

(3) Weight Ratio of each Unsaturated Monomer

The weight ratio (1)/(2) of the phosphoric acid group-containing, unsaturated monomer (1) to the other unsaturated monomer (2) is in a range of 100/0–20/80, preferably 80/20–50/50. Among the other unsaturated monomer (2), the weight ratio (2-1)/(2-2) of the acid group-containing, unsaturated monomer (2-1) to the an unsaturated monomer (2-2) other than the above unsaturated monomer (2-1) is preferably in a range of 100/0–50/50, such that the acid group-containing, unsaturated monomer (2-1) exerting positive effects onto proton conductivity is dominant. Accordingly, particularly when the sulfonic acid group-containing, unsaturated monomer is used as the acid group-containing, unsaturated monomer (2-1), the weight ratio of the phosphoric acid group-containing, unsaturated monomer/the sulfonic acid group-containing, unsaturated monomer is 100/0–20/80, preferably 80/20–50/50, and the weight ratio of the sulfonic acid group-containing, unsaturated monomer/the other acid group-containing, unsaturated monomer (2-1-2) is 100/0–50/50.

[II] Photopolymerization Initiator

Photopolymerization initiators added to the monomer composition in the present invention may be (1) Polyketones represented by R—(CO)$_x$—R', wherein R, R'=hydrogen or a hydrocarbon group, x=2–3, (for instance, diacetyl, dibenzyl, etc.);

(2) α-Carbonyl alcohols represented by R—CO—CHOH—R', wherein R, R'=hydrogen or a hydrocarbon group (for instance, benzoin, etc.);

(3) Acyloin ethers represented by R—CH(OR")—CO—R', wherein R, R', R"=a hydrocarbon group (for instance, benzoin methyl ether, etc.);

(4) α-Substituted acyloins represented by Ar—CR(OH)—CO—Ar, wherein Ar=an aryl group, R=a hydrocarbon group (for instance, α-alkyl benzoin, etc.); and (5) Polynuclear quinones (for instance, 9,10-anthraquinone, etc.).

These photopolymerization initiators may be used alone or in combination.

The amount of the photopolymerization initiator used is in a range of 0.5–5% by weight, preferably 1–3% by weight, based on the total weight of the unsaturated monomer. If the amount of the photopolymerization initiator used were less than 0.5% by weight, polymerization or copolymerization would not be completed in a predetermined ultraviolet irradiation time, resulting in undesirably leaving an unreacted monomer. On the other hand, if the amount of the photopolymerization initiator used were more than 5% by weight, the resultant resin would have too small a degree of polymerization, undesirably tending to be colored.

In the present invention, for the purposes of facilitating the dissolving of the photopolymerization initiator in the monomer mixture, lowering the viscosity of the unsaturated monomer, facilitating the impregnation of the reinforcing sheet therewith, reducing the amount of the monomer mixture attached to the reinforcing sheet to make the polymer electrolyte (composite) membrane thinner, etc., a low-boiling point solvent such as methanol, acetone, etc. may be added as a diluent.

[III] Reinforcing Sheet

The reinforcing sheets used in the present invention are classified into the following three groups.

(1) Sheet of Inorganic Fibers

Woven fabrics, non-woven fabrics, papers, etc. constituted by glass fibers, alumina fibers, rock wool fibers, slug fibers, etc. are included. The inorganic fiber sheet has a basis weight of 10–60 mg/cm$^2$, preferably 10–40 mg/cm$^2$, and a thickness of 1–60 μm, preferably 5–40 μm.

(2) Sheet of Organic Fibers

Woven fabrics, non-woven fabrics, papers, etc. constituted by nylon fibers, polyester fibers, acrylic fibers, aramide fibers, etc. are included. Because the temperature of the polymer electrolyte (composite) membrane may be elevated to nearly 100° C. at the time of ultraviolet irradiation, the organic fiber sheet should have sufficient heat resistance to withstand such temperature. The organic fiber sheet has the same basis weight and thickness as in the case (1). However, when monomer compositions for impregnation or coating contain unsaturated monomers having strong acid groups such as a sulfonic acid group, etc., woven fabrics, non-woven fabrics, papers, etc. of nylon fibers are not suitably used because the nylon fibers do not have sufficient acid resistance.

(3) Resin Film

Resin films, which are impregnated or coated with the monomer compositions, are preferably films of polyethylene, polypropylene, poly(3-methylpentene), nylon-6, polyesters, thermoplastic polyurethanes, polysulfones, polyethersulfones, polyetherether ketones, aramides, polyimides, fluororesins, etc. Though the resin film may be microporous or non-porous, the former is preferable because of ease of impregnation of the monomer composition. However, when the monomer composition for impregnation contains an unsaturated monomer having a strong acid group such as a sulfonic acid group, etc., the nylon film is not preferable because it does not have sufficient acid resistance.

In the case of the microporous film, the fine pores are preferably as small as possible, particularly having sub-micron diameters. Also, the porosity of the entire microporous film is preferably as large as possible, particularly 40–50% based on the surface area. The thickness of the resin film is preferably 1–40 μm, more preferably 5–25 μm.

Though a weight ratio of the reinforcing sheet to the monomer composition may largely vary depending on the affinity of the reinforcing sheet for the monomer composition, in other words, the absorption of the monomer composition, the weight ratio of the reinforcing sheet to the monomer composition is preferably in a range of 1/20–1/2.

[IV] Production of Polymer Electrolyte (Composite) Membrane

The polymer electrolyte membrane made of a phosphoric acid group-containing, unsaturated monomer and a sulfonic acid group-containing, unsaturated monomer can be produced by casting a composition comprising both unsaturated monomers and a photopolymerization initiator on a molding die, covering the cast composition with ultraviolet-transmitting plates, and subjecting it to ultraviolet irradiation so that both unsaturated monomers are copolymerized.

Also, the polymer electrolyte composite membrane comprising a phosphoric acid group-containing, unsaturated monomer (or a phosphoric acid group-containing, unsaturated monomer and sulfonic acid group-containing, unsaturated monomer) and a reinforcing sheet can be produced by impregnating or coating the reinforcing sheet with a composition comprising an unsaturated monomer and a photopolymerization initiator, sandwiching the reinforcing sheet by ultraviolet-transmitting support substrates, and irradiating ultraviolet rays to the composition to cause the photopolymerization of the unsaturated monomer.

The two support substrates for sandwiching the monomer composition-impregnated reinforcing sheet in polymerization by ultraviolet irradiation should have high ultraviolet transmittance, and sufficient heat resistance to withstand the temperature elevation during the polymerization, and keep good peelability without adhering to the unsaturated monomer composition and a polymer electrolyte formed therefrom.

Though the flat glass plate usually used is extremely good in ultraviolet transmittance and heat resistance, it adheres to a polymer electrolyte obtained by polymerizing or copolymerizing the unsaturated monomer used in the present invention. Accordingly, the flat glass plate is preferably coated with a silicone parting agent or a fluorine-containing parting agent, or covered by a thin, transparent fluororesin film in advance.

Usable other than the flat glass plate are flat resin plates having good ultraviolet transmittance and heat resistance of 100° C. or higher, which may be made of fluororesins such as polyperfluorovinyl ether resins (PFA) and polyvinylidene fluoride resins (PVDF), as well as poly(3-methylpentene), polypropylene, etc.

In the ultraviolet irradiation of the cast unsaturated monomer composition sandwiched by the ultraviolet-transmitting plates, or in the ultraviolet irradiation of the unsaturated monomer composition-impregnated or coated reinforcing sheet sandwiched by the two support substrates, air and an excess unsaturated monomer composition should be squeezed out. For instance, when the reinforcing sheet is used, as shown in FIG. 1, ultraviolet irradiation is carried out preferably by keeping the unsaturated monomer composition-impregnated or coated reinforcing sheet horizontally with the two support substrates fixed by clips or clamps while applying pressure between the two support substrate uniformly. The intensity of ultraviolet irradiation at the time of the photopolymerization is 5–50 mW/cm$^2$, preferably 10–25 mW/cm$^2$.

The thickness of the polymer electrolyte (composite) membrane is 300 μm or less, preferably 10–100 μm, more preferably 10–30 μm.

The present invention will be explained in further detail by Examples below without intention of restricting the present invention thereto.

EXAMPLES 1–16, AND COMPARATIVE EXAMPLES 1–4

Figure 2:
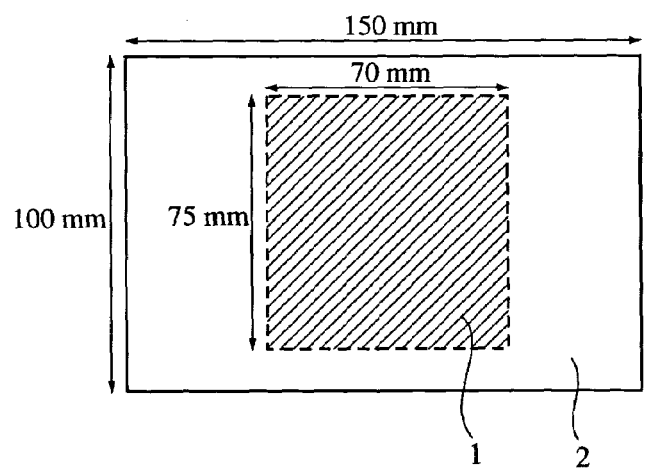
FIG. 2 is a plan view showing a polymer electrolyte composite membrane sandwiched between two flat glass plates.
Figure 3A:
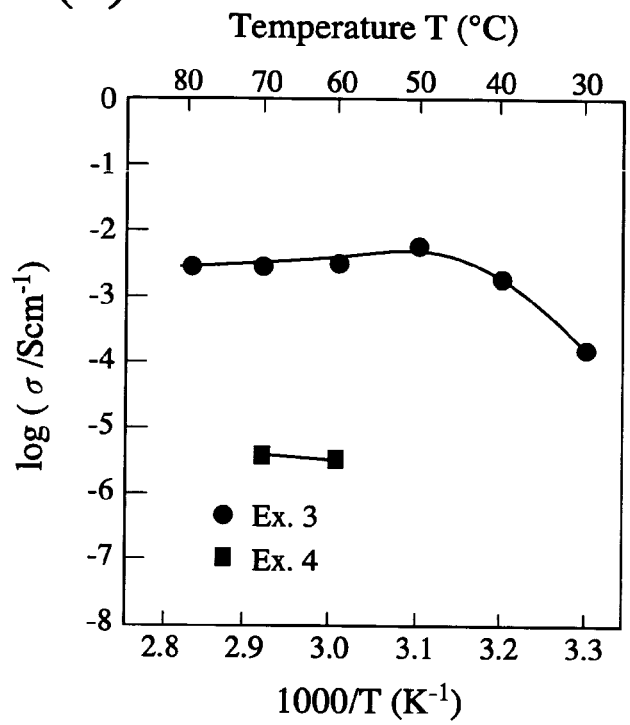
FIG. 3(a) is a graph showing the relation between temperature T (° C.) and conductivity [log(σ/$Scm^{-1}$)] in the polymer electrolyte composite membranes of Examples 3 and 4.
Figure 3B:
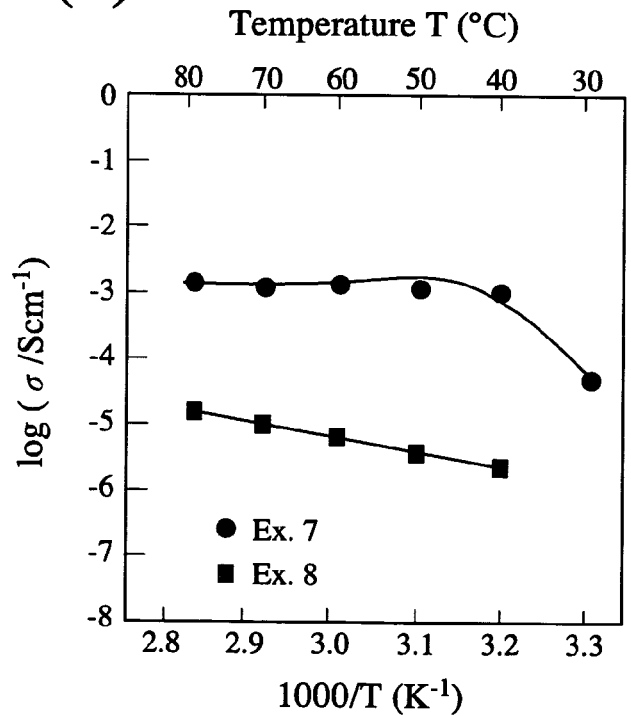
FIG. 3(b) is a graph showing the relation between temperature T (° C.) and conductivity [log(σ/Scm$^{-1}$)] in the polymer electrolyte composite membranes of Examples 7 and 8.
Figure 3C:
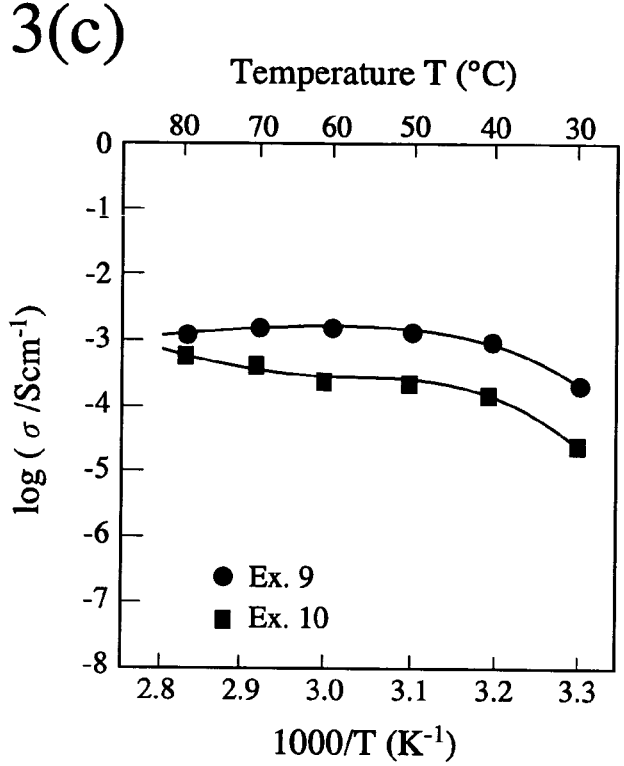
FIG. 3(c) is a graph showing the relation between temperature T (° C.) and conductivity [log(σ/Scm$^{-1}$)] in the polymer electrolyte composite membranes of Examples 9 and 10.
Figure 3D:
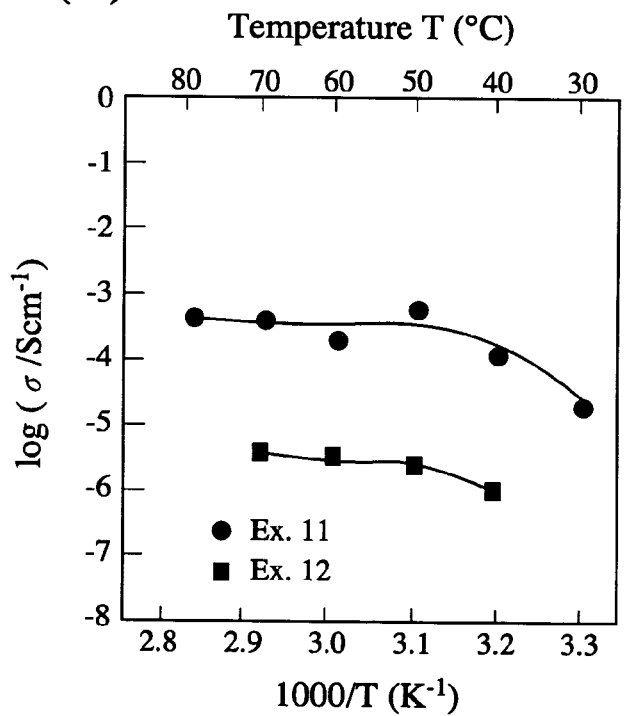
FIG. 3(d) is a graph showing the relation between temperature T (° C.) and conductivity [log(σ/Scm$^{-1}$)] in the polymer electrolyte composite membrane of Examples 11 and 12.
Figure 3E:
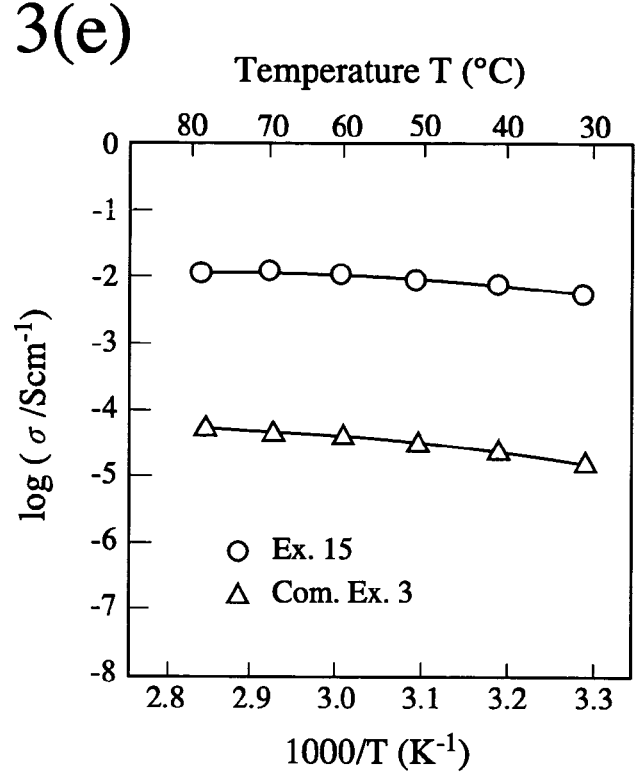
FIG. 3(e) is a graph showing the relation between temperature T (° C.) and conductivity [log(σ/Scm$^{-1}$)] in the polymer electrolyte composite membranes of Example 15 and Comparative Example 3.
Figure 3F:
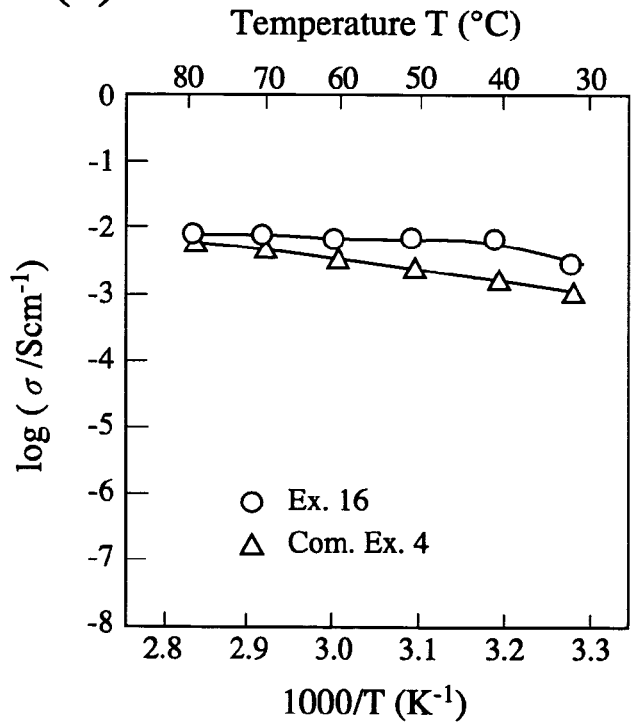
FIG. 3(f) is a graph showing the relation between temperature T (° C.) and conductivity [log(σ/Scm$^{-1}$)] in the polymer electrolyte composite membranes of Example 16 and Comparative Example 4.

After adding methanol as a diluent to an unsaturated monomer composition shown in Table 3 to adjust its viscosity, 2% by weight of Irgacure 651 (2,2-dimethoxy-1,2-diphenylethane-1-on) and 1% by weight of Irgacure 500 (1-hydroxycyclohexylphenyl ketone+benzophenone) as photopolymerization initiators were dissolved in 100% by weight (as a total amount) of the unsaturated monomer. Using various non-woven fabrics or papers as reinforcing sheets, each reinforcing sheet was impregnated with each unsaturated monomer composition, and each unsaturated monomer composition-impregnated reinforcing sheet was sandwiched by two flat glass plates coated with a silicone parting agent as shown in FIGS. 1 and 2. Using a high-voltage mercury lamp (TOSCURE 400, HC-0411, available from Toshiba Lighting K. K.), each unsaturated monomer composition-impregnated reinforcing sheet was irradiated with 20 mW/cm$^2$ of ultraviolet rays for a predetermined period of time, to photo-polymerize the unsaturated monomer composition, thereby producing a polymer electrolyte composite membrane. The unsaturated monomer compositions, the types and basis weight of the reinforcing sheets, ultraviolet irradiation time, and the conditions of the resultant composite membranes are shown in Table 3.

TABLE 3

| No. | | Example 1 | Example 2 | Example 3 | Example 4 | Example 5 | Example 6 |
|---|---|---|---|---|---|---|---|
| Unsaturated | Phosmer M | 50 | — | 50 | — | 50 | — |
| Monomer | Phosmer PP | 50 | 95 | 50 | 95 | 50 | 95 |
| Composition | PSSA[1] | — | — | — | — | — | — |
| (wt. %) | HDDA[2] | — | 5 | — | 5 | — | 5 |
| Diluent MeOH (wt. %) | | 0   50   75 | 0   50   75 | 50   75 | 50   75 | 75 | 50 |
| Reinforcing | Type | GF Non-Woven Fabric GHN-30CGL[3] | GF Non-Woven Fabric GHN-30CGL | GF Non-Woven Fabric GMC-050E[4] | GF Non-Woven Fabric GMC-050E | GF Paper[5] | GF Paper |
| Sheet | Basis Weight (mg/cm$^2$) | 30 | 30 | 50 | 50 | 40 | 40 |
| Irradiation Time (Front Surface + Rear Surface) (sec) | | 40 + 40 | 40 + 40 | 40 + 40 | 40 + 40 | 40 + 40 | 40 + 40 |

TABLE 3-continued

| Composite Membrane | Resin Reinforcing Sheet[10] | 9.6 | 7.5 | 4.7 | 8.5 | 6.1 | 4.2 | 7.2 | 4.0 | 6.0 | 5.0 | 4.5 | 5.3 |
|---|---|---|---|---|---|---|---|---|---|---|---|---|---|
| | Flatness | | Good | | Good | | Good | | Good | | Good | Good | Good |
| | Pinholes | | No | | No | | No | | No | | No | No | No |
| | Thickness (μm) | 170 | 140 | 110 | 160 | 130 | 110 | 170 | 120 | 160 | 100 | 90 | 87 |
| | Measurement of Conductivity | | No | | | | No | | Yes | No | Yes | No | No | No |

| No. | | Example 7 | Example 8 | Example 9 | Example 10 | Example 11 | Example 12 | Example 13 |
|---|---|---|---|---|---|---|---|---|
| Unsaturated Monomer Composition (wt. %) | Phosmer M | 50 | — | 50 | — | 50 | — | 50 |
| | Phosmer PP | 50 | 95 | 50 | 95 | 50 | 95 | 50 |
| | PSSA[1] | — | — | — | — | — | — | — |
| | HDDA[2] | — | 5 | — | 5 | — | 5 | — |
| Diluent MeOH (wt. %) | | 75 | 50 | 75 | 50 | 75 | 50 | 50 |
| Reinforcing Sheet | Type | PAN Paper[6] | PAN Paper | Aramide Non-Woven Fabric XL-1040[7] | Aramide Non-Woven Fabric XL-1040 | Aramide Paper[8] | Aramide Paper | High-pore 6022[9] |
| | Basis Weight (mg/cm²) | 38 | 38 | 40 | 40 | 35 | 35 | 25 |
| Irradiation Time (Front Surface + Rear Surface) (sec) | | 40 + 40 | 40 + 40 | 120 + 120 | 120 + 120 | 120 + 120 | 120 + 120 | 40 + 40 |
| Composite Membrane | Resin/Reinforcing Sheet[10] | 3.8 | 5.0 | 13.3 | 10.1 | 5.6 | 4.7 | 3.1 |
| | Flatness | Good | Good | Good | Good | Good | Good | Good |
| | Pinholes | No | No | No | No | No | No | No |
| | Thickness (μm) | 75 | 70 | 200 | 190 | 45 | 38 | 37 |
| | Measurement of Conductivity | Yes | Yes | Yes | Yes | Yes | Yes | No |

| No. | | Example 14 | Example 15 | Example 16 | Comparative Example 1 | Comparative Example 2 | Comparative Example 3 | Comparative Example 4 |
|---|---|---|---|---|---|---|---|---|
| Unsaturated Monomer Composition (wt. %) | Phosmer M | — | 50 | 50 | 50 | — | — | — |
| | Phosmer PP | 95 | — | — | 50 | 95 | — | — |
| | PSSA[1] | — | 50 | 50 | — | — | 100 | 100 |
| | HDDA[2] | 5 | — | — | — | 5 | — | — |
| Diluent MeOH (wt. %) | | 50 | 70 | 70 | 50 | 50 | 82 | 82 |
| Reinforcing Sheet | Type | High-pore 6022 | GF Non-Woven Fabric GHN-30CGL | Nylon Net | — | — | GF Non-Woven Fabric GHN-30CGL | Nylon Net |
| | Basis Weight (mg/cm²) | 25 | 30 | 50 | — | — | 30 | 50 |
| Irradiation Time (Front Surface + Rear Surface) (sec) | | 40 + 40 | 60 + 60 | 60 + 60 | 40 + 40 | 40 + 40 | 60 + 60 | 60 + 60 |
| Composite Membrane | Resin/Reinforcing Sheet[10] | 2.7 | 2.3 | 0.8 | — | — | 1.4 | 0.3 |
| | Flatness | Good | Good | Good | Good | Good | Good | Good |
| | Pinholes | No | No | No | No | No | No | No |
| | Thickness (μm) | 20 | 104 | About 100 | About 30 | About 20 | 52 | 100 |
| | Measurement of Conductivity | No | Yes | Yes | No | No | Yes | Yes |

Note:
[1]PSSA: p-Styrene sulfonic acid.
[2]HDDA: Hexamethylenediol diacrylate.
[3]GF (glass fiber) non-woven fabric (GHN-30CGL, commercially available from Oji Paper Co. Ltd.).
[4]GF (glass fiber) non-woven fabric (GMC-050E commercially available from Oji Paper Co. Ltd.).
[5]GF (glass fiber) paper (test sample of Awa Paper Co. Ltd.).
[6]PAN (polyacrylonitrile) paper (test sample of Awa Paper Co. Ltd.)
[7]Aramide non-woven fabrics (XL-1040, test sample of Japan Vilene Co., Ltd.)
[8]Aramide paper (test sample of Awa Paper Co. Ltd.).
[9]PE (polyethylene) microporous film (High-Pore™ 6022 available from Asahi Chemical Industry Co. Ltd.).
[10]A weight ratio of resin/reinforcing sheet.

With respect to typical polymer electrolyte composite membranes in Examples and Comparative Examples, conductivity was measured at a relative humidity of 90% in a temperature range of 30–80° C. The results are shown in FIGS. 3(a)–(f).

It is clear from the results shown in Tables 3 (a)–(f) that flat polymer electrolyte composite membranes free from pinholes can be produced with any reinforcing sheets by the method of the present invention. The use of a diluent contributed to the reduction of the amount of a resin attached to the reinforcing sheet to the order of one tenth or less. Though the polymer electrolyte composite membranes of Examples are as thick as 20–200 μm, they can be provided with a desired thickness by properly adjusting the basis weight of the reinforcing sheets, the affinity of the unsaturated monomer compositions for the reinforcing sheets, and the percentages of the resins attached to the reinforcing sheets, in other words, the amounts of the monomer compositions attached and pressure for squeezing them.

It is clear from FIGS. 3(a)–(f) that the polymer electrolyte composite membrane of the present invention has conductivity on the order of $10^{-5}$–$10^{-2}$ Scm$^{-1}$, a good level as a polymer electrolyte having a phosphoric acid group as a functional group. Particularly in the case of the polymer electrolyte composite membranes of Examples 15 and 16 made of phosphoric acid group/sulfonic acid group-containing resins, which are copolymers of phosphoric acid group-containing, unsaturated monomers and p-styrene sulfonic acid, the temperature dependency of electric conductivity was extremely low, exhibiting as high electric conductivity as $10^{-3}$–$10^{-2}$ Scm$^{-1}$ in a temperature range of 30–80° C. On the other hand, the polymer electrolyte composite membranes of Comparative Examples 3 and 4, which were made of a homopolymer of p-styrene sulfonic acid, had lower electric conductivity and higher temperature dependency of electric conductivity than those of the polymer electrolyte composite membranes of Examples 15 and 16.

Though the experimental results of polymer electrolyte composite membranes having reinforcing sheets are shown in the above Examples, it is clear that polymer electrolyte membranes free from reinforcing sheets also have the same electrolyte characteristics. Accordingly, polymer electrolyte membranes having no reinforcing sheets can suitably be used for applications that are not required to have high mechanical strength.

As described above in detail, by copolymerizing a composition comprising a phosphoric acid group-containing, unsaturated monomer and a sulfonic acid group-containing, unsaturated monomer by ultraviolet irradiation, etc. after casting, or by polymerizing or copolymerizing a composition comprising a phosphoric acid group-containing, unsaturated monomer (or a phosphoric acid group-containing, unsaturated monomer and a sulfonic acid group-containing, unsaturated monomer) by ultraviolet irradiation, etc. after impregnating or coating a reinforcing sheet therewith, it is possible to obtain a polymer electrolyte (composite) membrane having high proton conductivity in a wide temperature and humidity range without discharging an organic solvent. Particularly the polymer electrolyte composite membrane comprising a reinforcing sheet is advantageous in excellent heat resistance, chemical resistance and dimensional stability.

Also, the polymer electrolyte (composite) membrane comprising a phosphoric acid group/sulfonic acid group-containing resin, which is a copolymer of a phosphoric acid group-containing, unsaturated monomer and a sulfonic acid group-containing, unsaturated monomer, has higher electric conductivity and lower temperature dependency of electric conductivity.

The polymer electrolyte (composite) membranes of the present invention having such features are suitably used for solid electrolyte membranes of primary cells, second cells, fuel cells, etc., and for display devices, various sensors, signal-transmitting media, solid capacitors, ion-exchange membranes, etc.

What is claimed is:

1. A proton-conductive polymer electrolyte composite membrane comprising a phosphoric acid group/sulfonic acid group-containing resin and a reinforcing sheet; wherein said polymer electrolyte composite membrane is in a fuel cell; wherein said phosphoric acid group/sulfonic acid group-containing resin is a copolymer of a phosphoric acid group-containing, unsaturated monomer (1) having at least one phosphoric acid group and at least one ethylenic unsaturated bond in a molecule, and an unsaturated monomer (2) other than said phosphoric acid group-containing, unsaturated monomer (1); wherein said unsaturated monomer (2) comprises an unsaturated monomer (2-1) having an acid group except for the phosphoric acid group, and optionally comprises an unsaturated monomer (2-2) having at least one ethylenic unsaturated bond other than said unsaturated monomer (2-1); wherein said unsaturated monomer (2-1) comprises a sulfonic acid group-containing, unsaturated monomer (2-1-1), said sulfonic acid group-containing, unsaturated monomer (2-1-1) having at least one sulfonic acid group and at least one ethylenic unsaturated bond in a molecule, and optionally comprises an unsaturated monomer (2-1-2), said unsaturated monomer (2-1-2) having an acid group except for a phosphoric acid group and a sulfonic acid group and at least one ethylenic unsaturated bond; wherein a weight ratio of(1)/(2) is 80/20–50/50; wherein a weight ratio of(2-1)/(2—2) is 100/0–50/50; wherein a weight ratio of (1)/(2-1-1) is 80/20–50/50; and wherein a weight ratio of (2-1-1)/(2-1-2) is 100/0–50/50.

2. The polymer electrolyte composite membrane according to claim 1, wherein said phosphoric acid group-containing, unsaturated monomer is represented by the following general formula (A):

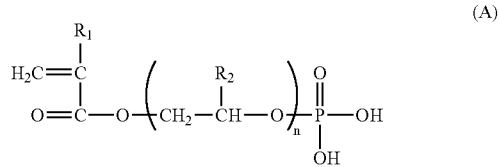

wherein $R_1$ represents hydrogen or an alkyl group, $R_2$ represents hydrogen or a substituted or unsubstituted alkyl group, and n represents an integer of 1–6.

3. The polymer electrolyte composite membrane according to claim 2, wherein $R_1$ represents H or $CH_3$, and $R_2$ represents H, $CH_3$ or $CH_2Cl$.

4. The polymer electrolyte composite membrane according to claim 1, wherein said sulfonic acid group-containing, unsaturated monomer (2-1-1) is p-styrene sulfonic acid.

5. The polymer electrolyte composite membrane according to claim 1, wherein said reinforcing sheet is a sheet constituted by inorganic or organic fibers.

6. The polymer electrolyte composite membrane according to claim 5, wherein said reinforcing sheet is a woven fabric, a non-woven fabric or a paper.

7. The polymer electrolyte composite membrane according to claim 1, wherein said reinforcing sheet is a resin film.

8. The polymer electrolyte composite membrane according to claim 7, wherein said resin film is microporous.

9. A method for producing a proton-conductive polymer electrolyte composite membrane comprising a phosphoric acid group/sulfonic acid group-containing resin and a reinforcing sheet, said method comprising the steps of (a) impregnating or coating said reinforcing sheet with a mixture of a phosphoric acid group-containing, unsaturated monomer (1) having at least one phosphoric acid group and at least one ethylenic unsaturated bond in a molecule, and an unsaturated monomer (2) other than said phosphoric acid group-containing, unsaturated monomer (1); and (b) copolymerizing said mixture; wherein said unsaturated monomer (2) comprises an unsaturated monomer (2-1) having an acid group except for the phosphoric acid group, and optionally comprises an unsaturated monomer (2-2) having at least one ethylenic unsaturated bond other than said unsaturated monomer (2-1); wherein said unsaturated monomer (2-1) having an acid group except for the phosphoric acid group comprises a sulfonic acid group-containing, unsaturated monomer (2-1-1), said sulfonic acid group-containing, unsaturated monomer (2-1-1) having at least one sulfonic acid group and at least one ethylenic unsaturated bond in a molecule, and optionally comprises an unsaturated monomer (2-1-2), said unsaturated monomer (2-1-2) having an acid group except for a phosphoric acid group and a sulfonic acid group and at least one ethylenic unsaturated bond; wherein a weight ratio of (1)/(2) is 80/20–50/50; wherein a weight ratio of (2-1)/(2-2) is 100/0–50/50; wherein a weight ratio of (1)/(2-1-1) is 80/20–50/50; wherein a weight ratio of (2-1-1)/(2-1-2) is 100/0–50/50; and wherein said polymer electrolyte composite membrane is utilized in a fuel cell.

10. The method according to claim 9, further comprising adding a photopolymerization initiator to a mixture of said phosphoric acid group-containing, unsaturated monomer (1) and said unsaturated monomer (2) to form a composition; impregnating or coating said reinforcing sheet with said composition, sandwiching said reinforcing sheet with ultraviolet-transmitting support substrates, and subjecting said composition to ultraviolet irradiation to copolymerize said phosphoric acid group-containing, unsaturated monomer (1) and said unsaturated monomer (2).

11. The method according to claim 9, wherein said phosphoric acid group-containing, unsaturated monomer (1) is represented by the following general formula (A):

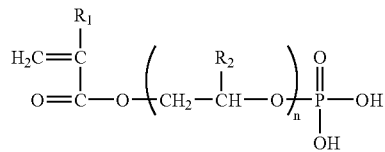

(A)

wherein $R_1$ represents hydrogen or an alkyl group, $R_2$ represents hydrogen or a substituted or unsubstituted alkyl group, and n represents an integer of 1–6.

12. The method according to claim 11, wherein $R_1$ represents H or $CH_3$, and $R_2$ represents H, $CH_3$ or $CH_2Cl$.

13. The method according to claim 9, wherein said sulfonic acid group-containing, unsaturated monomer (2-1-1) is p-styrene sulfonic acid.

14. The method according to claim 9, wherein said reinforcing sheet is a sheet constituted by inorganic or organic fibers.

15. The method according to claim 14, wherein said reinforcing sheet is a woven fabric, a non-woven fabric or a paper.

16. The method according to claim 9, wherein said reinforcing sheet is a resin film.

17. The method according to claim 16, wherein said resin film is microporous.

18. The polymer electrolyte composite membrane according to claim 1, wherein said polymer electrolyte composite membrane has an electric conductivity of $10^{-3}$–$10^{-2}$ $Scm^{-1}$ in a temperature range of 30–80° C.

19. The method according to claim 9, wherein said polymer electrolyte composite membrane has an electric conductivity of $10^{-3}$–$10^{-2}$ $Scm^{-1}$ in a temperature range of 30–80° C.

* * * * *